United States Patent
Patyk et al.

[19]

[11] Patent Number: 5,939,807
[45] Date of Patent: Aug. 17, 1999

[54] CAP MOUNTED DRIVE FOR A BRUSHLESS DC MOTOR

[75] Inventors: Guy J. Patyk, Hopkins; Curtis O. Olsen, Oakdale, both of Minn.

[73] Assignee: Reliance Electric Industrial Company, Cleveland, Ohio

[21] Appl. No.: 08/991,885

[22] Filed: Dec. 16, 1997

[51] Int. Cl.[6] .............................. H02K 5/00; H02K 1/32; H02K 11/00; H02K 23/00

[52] U.S. Cl. .......................... 310/89; 310/64; 310/68 R; 318/254

[58] Field of Search ............................. 310/89, 90, 68 R, 310/68 B, 6 U; 318/138, 254

[56] References Cited

U.S. PATENT DOCUMENTS

| | | | |
|---|---|---|---|
| 4,288,839 | 9/1981 | Prager | 361/386 |
| 4,605,986 | 8/1986 | Bentz et al. | 361/386 |
| 4,698,542 | 10/1987 | Muller | 310/67 R |
| 4,707,726 | 11/1987 | Tinder | 357/81 |
| 4,840,222 | 6/1989 | Lakin et al. | 165/47 |
| 4,923,179 | 5/1990 | Mikolajczak | 267/160 |
| 4,972,294 | 11/1990 | Moses, Jr. et al. | 361/386 |
| 5,006,744 | 4/1991 | Archer et al. | 310/89 |
| 5,060,112 | 10/1991 | Cocconi | 361/386 |
| 5,640,062 | 6/1997 | Yockey | 310/68 D |

OTHER PUBLICATIONS

Fasco, "3.3 Brushless DC, Electronically Commutated Fasco type 04, 1/30 to 1/4 H.P.", date and page nos. unknown.
Machine Design, "Appliance Industry Focus", pp. 73–75, Aug. 8, 1996.
Appliance Manufacturer, "Designing With An Aim" p. 63, Jul. 1996.
Control Engineering, "What's Driving Drives?", p. 41, Mar. 1996.
Eastern Air Device, Inc. "Motor Works in Harsh Areas", date and pages nos. unknown.
Grundfos, "Motors With A Difference", Denmark, date and pages unknown.
Control Engineering, "Ultimate Motor–to–Controller Matching" pp. 48 and 50, Dec. 1995.
Control Engineering, "Adjustable–speed drive and induction motor in single package" p. 97, Jan. 1996.
New Equipment Digest, "Efficient, Easy–To–Install Motor/Drive Package", p. 63, Jan. 1996.
Appliance Manufacturer, "Motors/Drives, Fans, Blowers, Compressors" p. 72, Feb. 1996.
Appliance Manufacture, "The EFM Motor's Electronics Monitor System Conditions and Adjusts Automatically to Deliver The Specified Volume of Air A Heating or Cooling System Is Designed to Use" p. 66, Apr. 1996.
Machine Design, "NDES '96 Gears Up For Innovation" p. 70, Mar. 7, 1996.
National Design Engineering Show '96, "Inverter Motor Unit" p. 80, Mar. 1996.
Control Engineering, "AC Inverter and Motor" p. 80, Dec. 1995.

(List continued on next page.)

*Primary Examiner*—Nestor Ramirez
*Assistant Examiner*—Dane Dinh Le
*Attorney, Agent, or Firm*—Patrick S. Yoder; John M. Miller; John J. Horn

[57] ABSTRACT

A brushless DC motor and drive package is disclosed, including modular subassemblies which are integrated into a single unit. The drive includes power electronic circuitry and related control circuitry which is supported on a circuit board within the package. The circuit board is supported on an end cap of the motor and is housed within the package housing. The end cap supporting the circuit board preferably forms a bearing support recess for receiving a shaft bearing. The resulting package is extremely compact, and reduces or eliminates the need for separate drive circuitry and related support hardware.

24 Claims, 11 Drawing Sheets

OTHER PUBLICATIONS

Framo, "Frequenzumrichter—Motor Fumo" page and date unknown.

Show Daily News, "Baldor to debut smart motor" page and date unknown.

Machine Design, "Gearing Up For Intellegent Motors", p. 54, Jul. 13, 1995.

PCIM, "Complete 32–Bit Motion System Resides in Motor Housing" pp. 28–32, Oct. 1994, California.

Animatics Corp., "Animatics SmartMotor Integral Brushless D.C. Motor, Controller, Amplifier & Encoder Users Manual", date unknown, California.

PCIM, "Integrated Motion System Simplifies Design, Improves Performance of Semiconductor Processing Equipment", pp. 44–45, Jan. 1995, California "Motor with Onboard Drive Could Become Major Trend", author, page and date unknown.

Emerson, "Controlled Induction Motor Systems" page and date unknown.

Power Transmission Design, "Brushless DC Drive", pp. 50–53, 1993.

Appliance Manufacturer, "On–Motor Control" pp. 29–30, Oct. 1997.

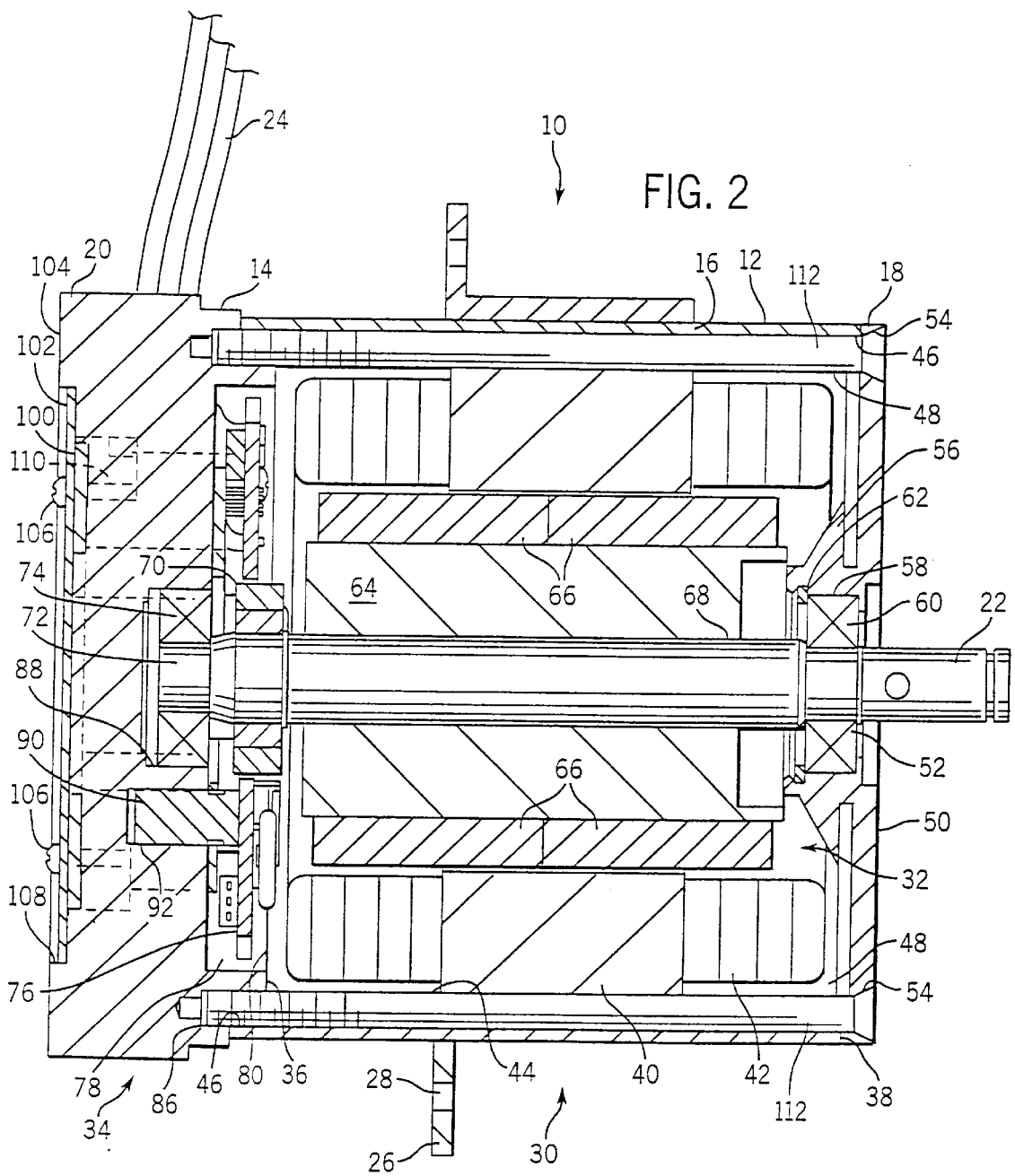

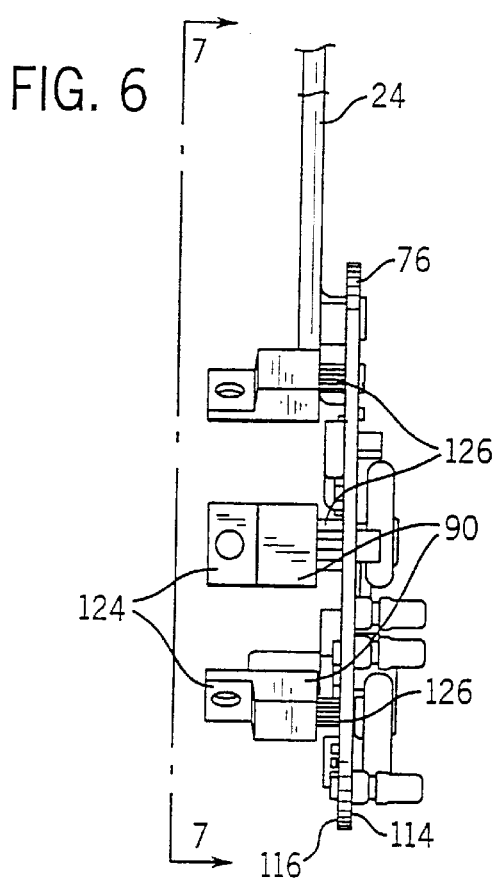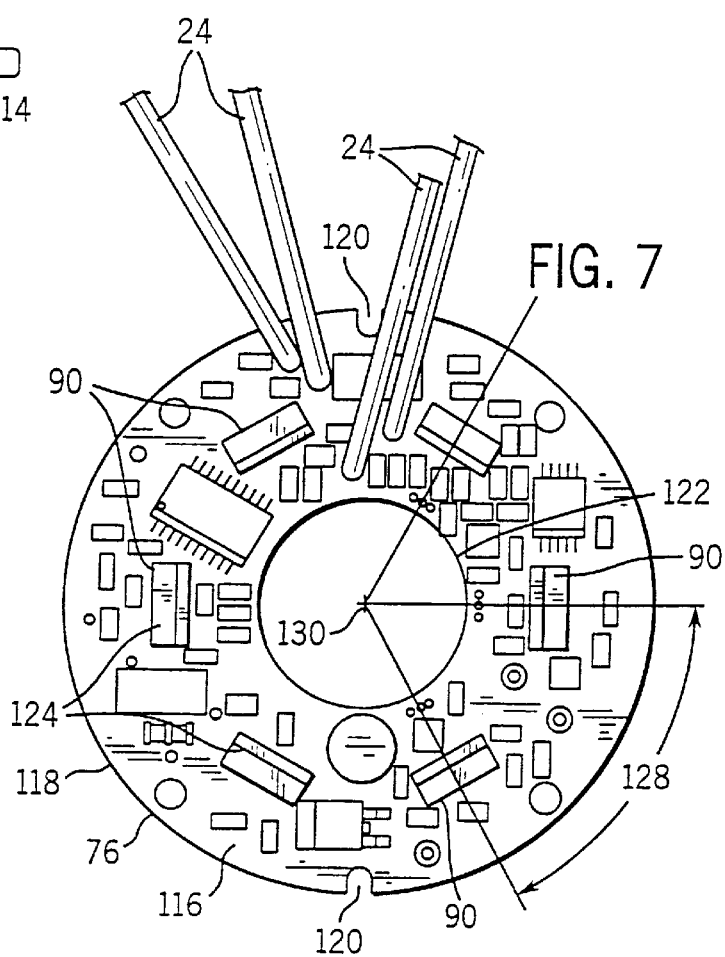

CAP MOUNTED DRIVE FOR A BRUSHLESS DC MOTOR

BACKGROUND OF THE INVENTION

1. Field of the Invention

The present invention relates generally to the field of brushless DC motor drives. More particularly, the invention relates to a drive for a brushless DC motor which is integrated or packaged with the motor in an end cap forming a unitary drive and motor assembly.

2. Description of the Related Art

A wide range of electric motors have been developed and are presently in use for driving a vast array of devices in rotation. In general, such motors fall within a number of classes, such as alternating current motors (e.g. induction motors) and direct current motors. In one type of direct current motor, commonly referred to as a brushless or synchronous motor, a rotor is supported in rotation in a housing and is surrounded by a stator or armature. The rotor may include a series of permanent magnets, the field of which cooperates with fields generated by stator windings to drive the rotor in rotation. Pulsed or alternating electric current is fed to the stator coils and the rotor is thus driven at a speed which is a function of the pulse frequency of the drive energy or a function of the duty cycle of the pulsed energy.

Because the rotational velocity of brushless DC motors may be easily controlled by controlling the pulse frequency or pulse width duty cycle of the incoming power, it is generally known to regulate speed of such motors by means of controllers configured to convert incoming power to a desired controlled frequency or duty cycle. The controlled power is then transmitted to the motor and the rotor is driven at a speed which is a function of the frequency or duty cycle. In one particularly useful technique for controlling brushless DC motors the rotational velocity of the motor is detected by sensors within the motor assembly, and the driving frequency or duty cycle is regulated in a closed-loop manner to maintain this rotational velocity at a desired level based upon the feedback information supplied by the sensors and upon a velocity control or command signal. The velocity control signal may be supplied in a variety of manners, such as via an operator-adjustable potentiometer or other input device, or by an automatic controller.

Controllers, also referred to as drives for brushless DC motors may convert either incoming alternating current electrical energy or direct current energy into the controlled-frequency or controlled-duty cycle energy required for driving the motor. In the former case, sometimes referred to as "off-line" drives, a full-wave rectifier circuit is typically included in the drive. Such drives are well suited to applications in which an alternating current power source is readily available, such as in most residential and industrial applications. However, in a number of applications, such alternating current power sources are unavailable and the drive circuitry must convert direct current energy from a source, such as a battery or generator, to the controlled-frequency or pulse width duty cycle energy required to drive the motor. Such applications include machinery mounted on or coupled to vehicles such as automobiles, buses, boats and so forth.

Conventionally, brushless DC motor drives, particularly of the type suited for receiving direct current electrical energy, have been designed and assembled separately from the motors with which they are associated. For example, the drive may be mounted within a separate enclosure supported on the DC motor housing. Conductors then extend from the drive enclosure through the motor housing to transmit the pulsed electrical energy to the motor stator. Alternatively, the drive may be formed as a modular unit which is added to an end of the motor housing.

While both of these known arrangements enable the motor to be assembled completely separately from the drive, the resulting package is somewhat unwieldy and may be difficult to install in certain applications. For example, in applications such as small fan drives, it is usually advantageous to maintain the motor and drive package as small as possible. In addition, in all applications the overall cost of the motor and drive package is often minimized when the number of separate parts in the package is reduced. However, conventional drives manufacturers have yet to develop brushless DC motor drives which satisfy the need for small, integrated units which are both economically priced and of high performance.

There is a need, therefore, for an improved motor drive which can be integrated with a brushless DC motor to form a single, compact and economical package. In particular, there is a need for a drive configured for coupling to a source of energy for a variety of applications, such as in vehicles. The drive should, ideally, afford the user the advantages of being easy to install, and provide a wide range of controllable parameters such as speed and torque.

SUMMARY OF THE INVENTION

The present invention provides a novel brushless DC motor drive and motor package designed to respond to these needs. All of the drive circuitry is integrated within a package which is positioned coaxially with the motor itself. In a particularly preferred arrangement, an end cap of the package supports the drive circuitry as well as a bearing for the rotor shaft. The cap and drive circuitry may be preassembled as a unit and added to the motor housing and rotor subassemblies during the manufacturing process. The cap may be formed in a variety of manners, depending upon the needs of the application. For example, the cap may be configured to dissipate heat from the motor as well as from the drive electronics. Moreover, the cap may be placed on either end of the motor, and may be closed or open, such as to permit the rotor shaft to penetrate therethrough. Also, in a particularly preferred configuration the drive circuitry is supported on a generally annular circuit board through which a portion of the rotor shaft extends. Power switching components may be positioned in radially spaced arrangement around the circuit board. The resulting package is both compact and straightforward to assembly and install.

Thus, in accordance with the first aspect of the invention, an integrated electric motor and drive system includes a housing, a rotor, a stator, a drive circuit and first and second end covers. The housing is substantially annular and has first and second ends. The rotor is supported for rotation in the housing and the stator is disposed in the housing, surrounding the rotor. The drive circuit is connected to the stator and includes a plurality of switching devices for generating pulsed electrical energy for causing rotation of the rotor. The first end cover is secured to the first end of the housing and has a first bearing for supporting the rotor in rotation. The second end cover is secured to the second end of the housing and supports the drive circuit. The second end cover also includes a second bearing for supporting the rotor in rotation. In a particularly preferred configuration, the drive circuit is supported on a substantially annular circuit board, and a rotor has a shaft which extends through the circuit board to the second bearing.

In accordance with another aspect of the invention, a drive unit is provided for a brushless DC motor. The motor includes a housing having first and second ends, a rotor having a shaft rotatable within the housing, and a stator disposed within the housing about the rotor. The drive unit includes a support and a drive circuit mounted on the support. The support has a central recess for receiving a bearing for supporting the rotor shaft. The support is configured to interface with the first end of the housing to secure the support to the housing. The drive circuit includes a plurality of switching devices for converting electrical energy to pulse electrical energy.

In accordance with a further aspect of the invention, a drive unit for a brushless DC motor includes a drive circuit and a support having first and second sides. The drive circuit includes a plurality of switching devices for converting electrical energy to pulsed electrical energy for driving the rotor of the motor. The support is configured to receive and support the drive circuit on the first side thereof. The first side of the support is configured to face a first end of the housing such that the support may be coupled to the housing to enclose the drive circuit therein. The support includes a plurality of apertures for receiving fasteners for securing the support to the housing.

In accordance with another aspect of the invention, an end cap is provided for an electric motor and drive system. The system includes a housing having first and second ends, a rotor having a shaft rotatable within the housing, stator disposed within the housing about the rotor, and a drive circuit having switching elements for converting electrical energy to pulsed electrical energy. The end cap includes a substantially cylindrical member having first and second sides. The first side is configured to receive and support the drive circuit. A bearing support surface is formed in the cap for receiving and supporting a rotor shaft bearing. A plurality of apertures are provided in the cap for receiving fasteners for securing the end cap to the housing.

BRIEF DESCRIPTION OF THE DRAWINGS

The foregoing and other advantages and features of the invention will become apparent upon reading the following detailed description and upon reference to the drawings in which:

FIG. 2 is a sectional view of the motor and drive package illustrated in the FIGS. 1A and 1B, along line 2—2;

FIG. 6 is a side elevational view of a circuit board on which drive and related circuitry is mounted in accordance with a presently preferred embodiment;

FIG. 7 is an end elevational view of the circuit board illustrated in FIG. 6;

DETAILED DESCRIPTION OF SPECIFIC EMBODIMENTS

Figure 1A:
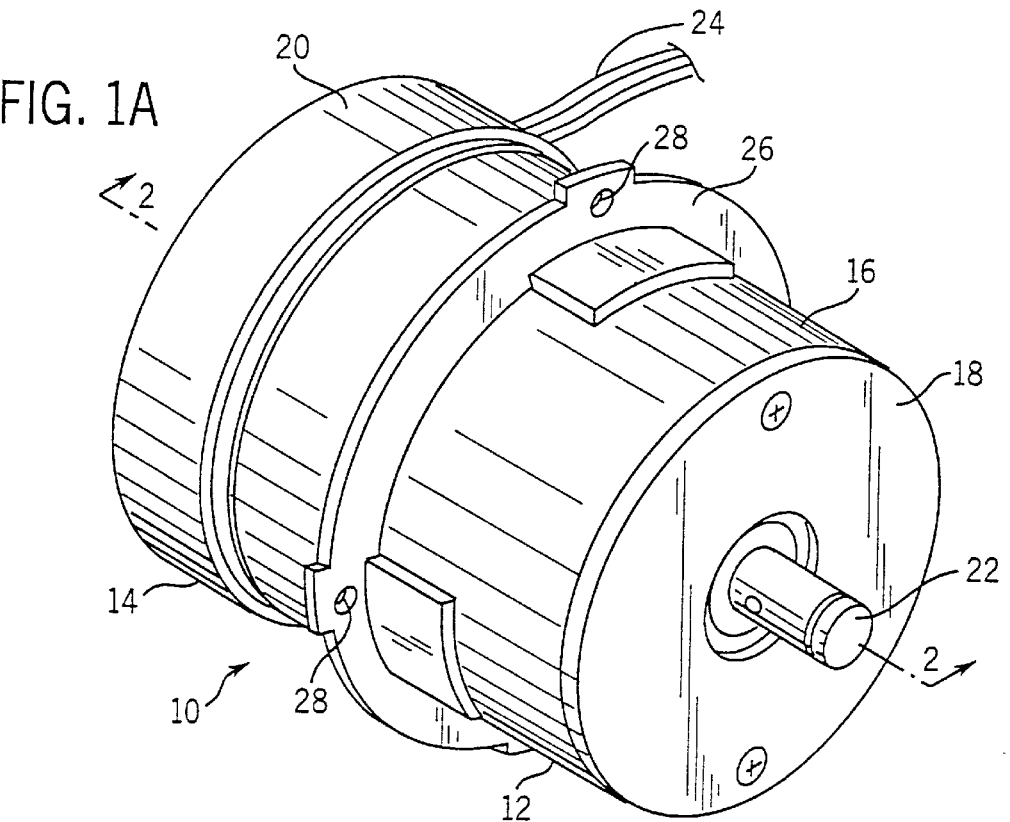
FIGS. 1A and 1B are perspective views of an electric motor and motor drive incorporating certain features of the present invention viewed from shaft and cap ends, respectively.
Figure 1B:
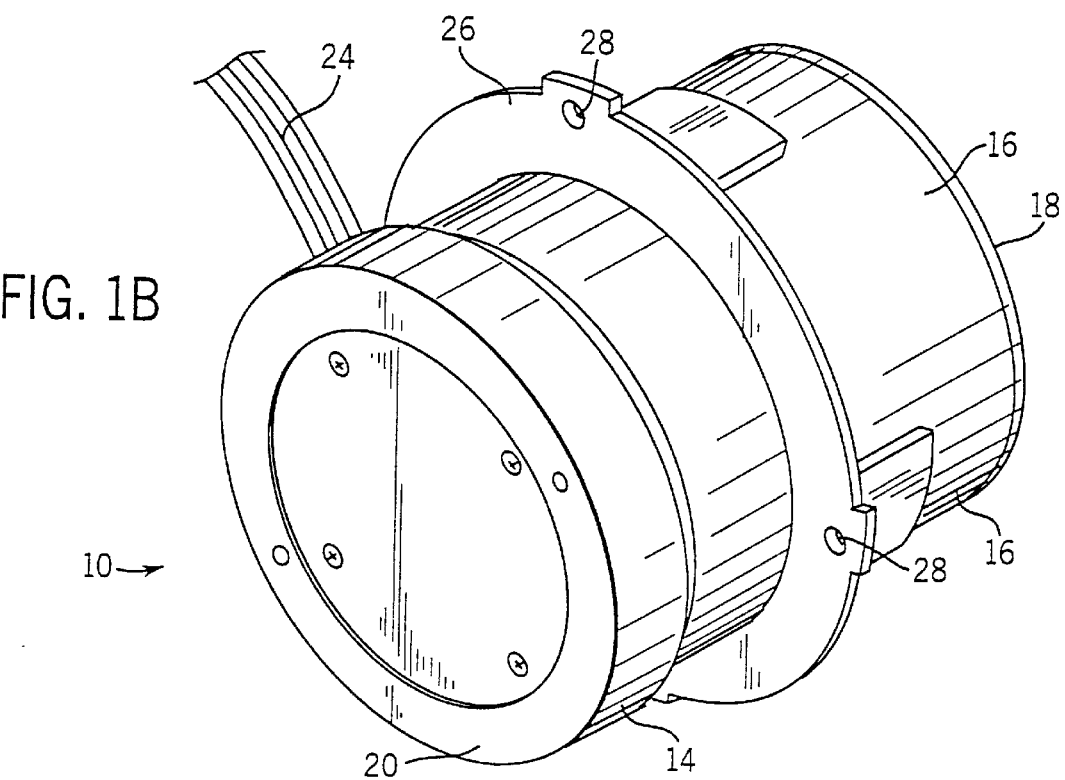

Turning now to the drawings, and referring first to FIGS. 1A and 1B, a motor and drive unit, designated generally by the reference numeral 10, is illustrated as including a brushless DC motor 12 and a drive 14 combined as a unitary package. Unit 10 includes a housing 16 covered on one end by a front end cap 18 and on an opposite end by a rear end cap 20. A driven shaft 22 extends through front end cap 18 and may be coupled to a load, such as an axial or radial fan (not shown) or other driven device. Leads 24 extend from unit 10 and are designed to be coupled to a source of electrical energy (not shown), and to a command device (not shown). The source of electrical energy may be of any suitable type, such as a 12 or 24 volt vehicle battery, or vehicle power supply system and so forth. The command device may be either a manual input device, such as a potentiometer coupled between unit 10 and a power source, or an automatic device, such as a digital or analog speed controller or automatic control circuit. In the particular embodiment illustrated in FIGS. 1A and 1B, a peripheral mounting flange 26 is secured to housing 16 and is traversed by mounting apertures 28 for receiving fasteners (not shown) permitting unit 10 to be secured in place during installation. As will be appreciated by those skilled in the art, unit 10 may also be mounted in other ways, such as via mounting aperatures (not shown) in end caps 18 or 20, or via a suitable clamp (not shown), and so forth.

Figure 3:
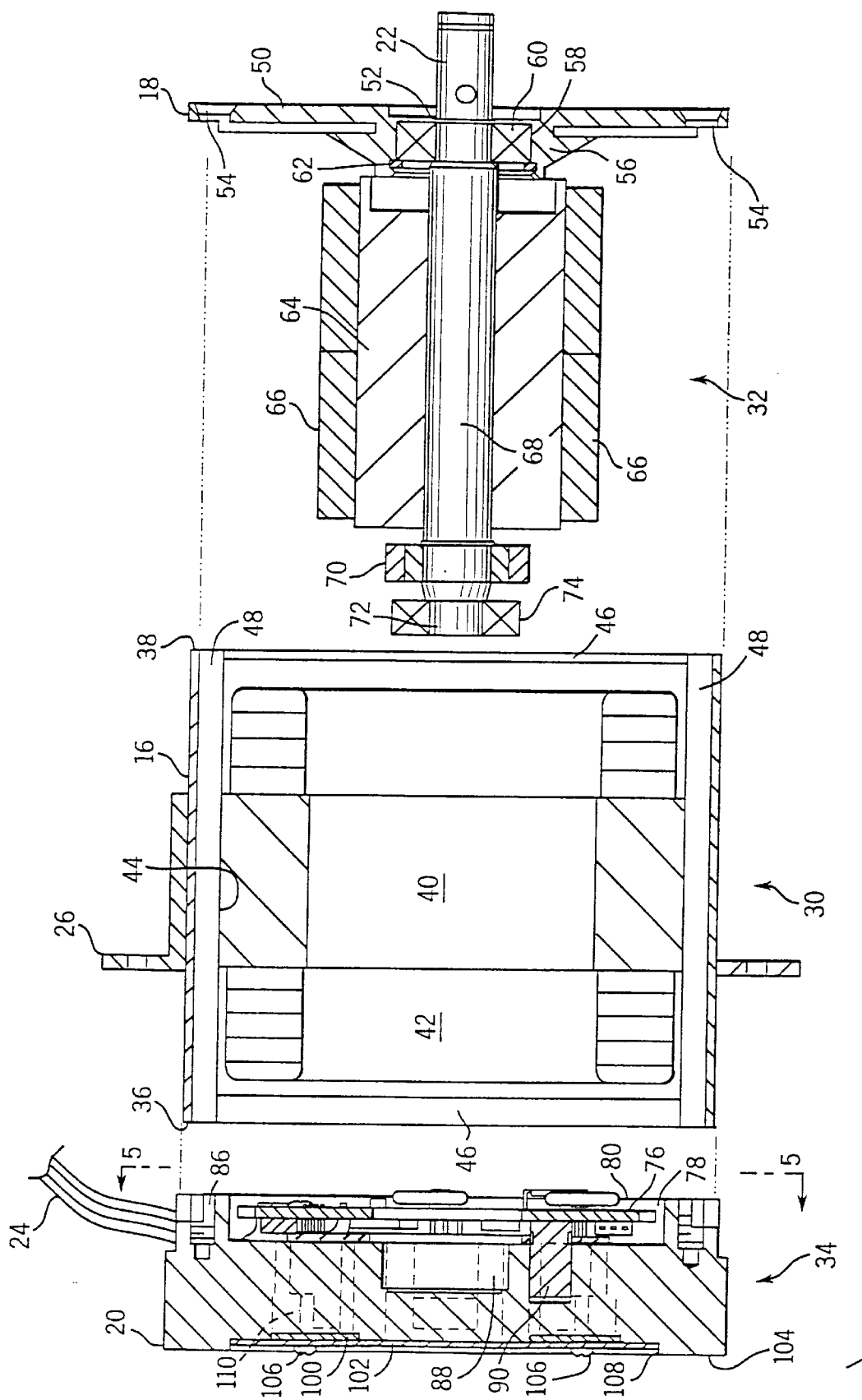
FIG. 3 is a partially exploded sectional view of the electric motor and drive package of FIG. 2 showing the subassemblies of the internal components of the package in accordance with a presently preferred embodiment.
Figure 4:
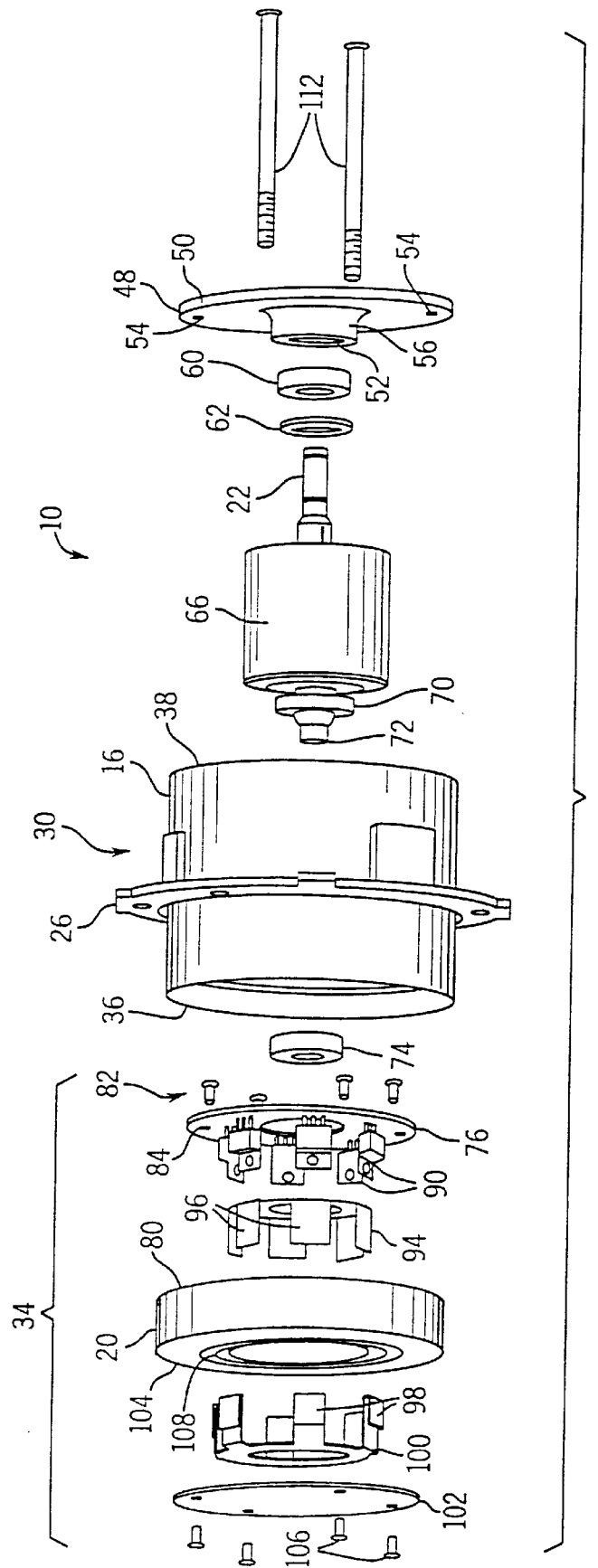
FIG. 4 is an exploded perspective view of the subassembly shown in FIG. 3 wherein certain components of the subassemblies have been further exploded to illustrate a preferred manner in which they are assembled in the package.

As best illustrated in FIGS. 2, 3 and 4, unit 10 is preferably constructed as an assemblage of independent subassemblies which may be separately manufactured and brought together in a final assembly process. Accordingly, unit 10 includes a stator/housing assembly 30, a rotor assembly 32, and a drive assembly 34. Stator/housing assembly 30 generally comprises the central portion of unit 10 formed as an annular structure having open ends for receiving rotor assembly 32 and drive assembly 34. Rotor assembly 32 closes an end of stator/housing assembly 30, and supports and positions rotary elements within stator/housing assembly 30 as described in greater detail below. In the preferred embodiment illustrated in the Figures, drive assembly 34 caps an end of assembly 30 opposite rotor assembly 32, and supports drive circuitry for controlling shaft 22 in accordance with command signals received via leads 24.

Referring more particularly now to the preferred construction of the motor subassemblies, stator/housing assembly 30 includes housing 16 formed as a cylindrical metallic shell having a first open end 36 and a second open end 38. A prefabricated metallic stator core 40, on which stator windings 42 are supported, is positioned within housing 16. Stator core 40 is preferably interference fit within an inner surface 44 of housing 16 during assembly. Stator core 40 and stator windings 42 may be of generally conventional construction in accordance with techniques well known to those skilled in the art. Housing 16 forms a pair of alignment surfaces 46 adjacent to ends 36 and 38, for receiving and properly aligning rotor assembly 32 and drive assembly 34 during final assembly of unit 10. In the particular embodiment illustrated, a pair of passages 48 are formed between stator core 40 and housing 16 for receiving elongated fasteners for securing the subassemblies of unit 10 to one another during final assembly, as described below.

Rotor assembly 32 includes front end cap 18, preferably configured as an annular metallic plate 50. A central aperture 52 is formed in the plate for permitting shaft 22 to extend therethrough. Fastener apertures 54 are formed in upper and lower positions near the periphery of plate 50 for receiving fasteners used to hold unit 10 together as a completed assembly. A support extension 56 extends rearwardly from plate 50 about central aperture 52. A bearing support recess 58 is formed in support extension 56 for receiving and supporting a bearing set 60. Bearing set 60 is fitted about shaft 22, and supports shaft 22 in rotation within unit 10. A retaining ring 62 may be provided on an inboard side of bearing set 60 for holding the bearing set in place following assembly and during operation.

Rotor assembly 32 further includes a rotor core 64 about which a series of permanent magnets 66 is secured. Core 64 is supported on a central portion 68 of shaft 22. Rotor core 64 is preferably made of a ferromagnetic alloy such as steel, and permanent magnet 66 are secured to the periphery thereof in a manner generally known in the art. A sensing magnet assembly 70 is secured adjacent to rotor core 64 for supplying feedback signals representative of the angular position of the rotor during operation, as discussed in greater detail below. Shaft 22 terminates in a support extension 72 on which a rear bearing set 74 is fixed. Bearing set 74, which may be substantially identical to bearing set 60, serves to support shaft 22, rotor core 64 and permanent magnet 66 in rotation.

Referring now to the preferred configuration of drive assembly 34, assembly 34 is preferably configured to include all circuitry required for powering stator windings 42 and thereby to drive shaft 22 in rotation, as well as control circuitry for commanding operation of the drive circuitry. Moreover, as illustrated in the Figures, in the presently preferred embodiment, drive assembly 34 serves to support bearing set 74 and to cover first end 36 of housing 16, thereby eliminating the need for a separate housing cover and mechanical support for shaft 22. Furthermore, drive assembly 34 preferably forms a heat sink which is thermally coupled to elements of the drive circuitry apt to generate significant heat during operation, so as to convey thermal energy from the drive circuitry to the ambient air during operation.

Drive assembly 34 includes a circuit board assembly 76 fitted within a recess 78 formed in a front side 80 of rear end cap 20. Fasteners 82 (see FIG. 4) extend through circuit board 76 to secure the board in place within recess 78 during assembly. Accordingly, a series of threaded apertures 84 are formed in rear end cap 20 for fixing circuit board 76 thereto (see e.g., apertures 84 illustrated in the alternative embodiment of end cap 20 shown in FIG. 10A). A pair of threaded apertures 86 are also formed within rear end cap 20 for receiving elongated fasteners for securing the subassemblies of unit 10 to one another. Also within rear end cap 20, a bearing support recess 88 is formed for receiving and supporting rear bearing set 74.

Figure 8:
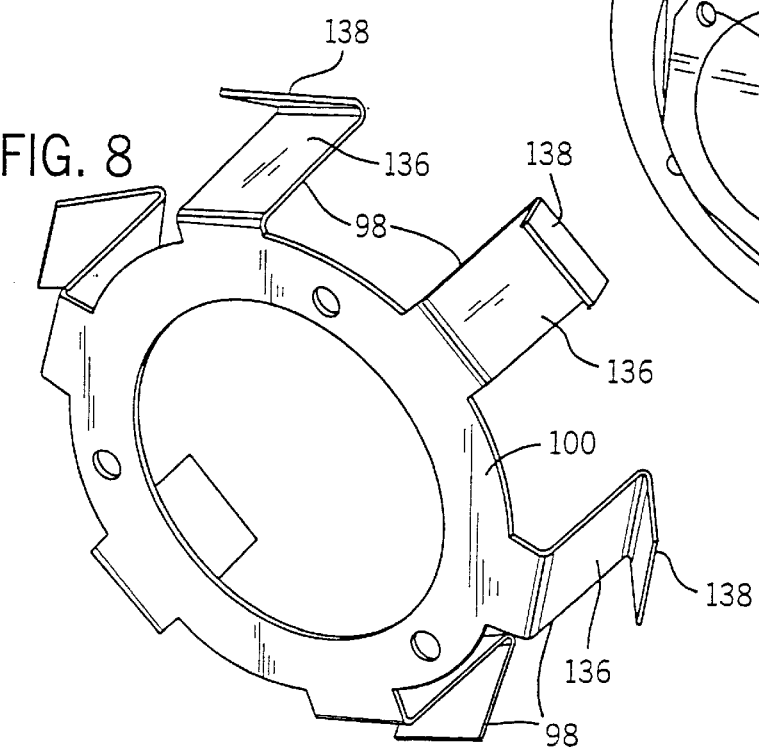
FIG. 8 is a perspective view of a biasing device for urging switching elements of the circuit board illustrated in FIGS. 6 and 7 toward thermally conductive surfaces of a heat sink in accordance with a presently preferred embodiment.

As best shown in FIGS. 4–7, circuit board 76 supports a plurality of power switching elements 90 for energizing stator windings 42 and thereby for driving shaft 22 in rotation. The preferred electrical configuration of switching elements 90 and associated drive circuitry supported on circuit board 76 will be described below with particular reference to FIGS. 9, 9A and 9B. However, physically, switching elements 90 are preferably packaged as standard lead frame devices which extend from circuit board 76 in a direction generally perpendicular to the plane of the circuit board. Recesses 92 (see FIGS. 2 and 5) are provided in rear end cap 20 extending from the front side 80 thereof at least partially therethrough. As circuit board 76 is installed on rear end cap 20, switching elements 90 extend into recesses 92 and are electrically isolated from end cap 20 by an insulative sil pad 94. Sil pad 94 includes a plurality of insulating extensions 96 which are interposed between switching elements 90 and end cap 20 as described in greater detail below. Biasing members 98 serve to urge the switching elements toward sides of recesses 92. In the preferred embodiment illustrated, a biasing member 98 is provided for each switching element 90. The biasing members are formed as single-piece clip 100 as illustrated in FIGS. 4 and 8, and as discussed in greater detail below. Clip 100 is preferably inserted into rear end cap 20 as shown in the exploded view of FIG. 4, and a cover 102 is installed over the clip to hold the clip securely in cap 20 and to substantially close the rear side 104 of end cap 20. A series of fasteners 106 extend through cover 102 and are received within rear end cap 20 to maintain cover 102 in place. As best shown in FIGS. 2 and 3, clip 100 and cover 102 are lodged within an annular recess 108 formed in rear side 104 of end cover 20. Apertures 110 are formed at a base of recess 108 for receiving fasteners 106.

The three subassemblies as described above are preferably manufactured separately and are mated with one another to complete unit 10 as best shown in FIGS. 2–4. Prior to assembly of drive assembly 34 within stator/housing assembly 30, leads (not shown) from stator windings 42 are connected to drive assembly 34 at terminals as described below with reference to FIG. 9. Drive assembly 34 is then fitted to housing end 36 and oriented so as to align apertures 86 with passages 48 of housing 16. Rotor assembly 32 is then fitted through second end 38 of housing 66. Rear bearing assembly 74 is thus fitted and supported within bearing support recess 88 of rear end cap 20, and central portion 68 of shaft 22 is positioned within housing 66 so as to align permanent magnets 16 within stator core 40. Plate 50 of front end cap 18 is fitted to second housing end 38 and oriented to align fastener apertures 54 with passages 48. Elongated fasteners 112 (see FIGS. 2 and 4) are then installed through aperture 54 and passages 48, and are threaded into fastener apertures 86 of rear end cap 20 to secure the three subassemblies to one another in the completed unit.

It should be noted that in the preferred arrangement illustrated and described above, drive assembly 34 forms an integral component of motor and drive unit 10. Moreover, housing 16 and rear end cap 20 serve to support, enclose and protect drive circuitry supported on circuit board 76. Furthermore, as described in detail below, rear end cap 20 serves as both a support for shaft 22 and as a heat sink for power switching elements 90 extending from circuit board 76.

Figure 5:
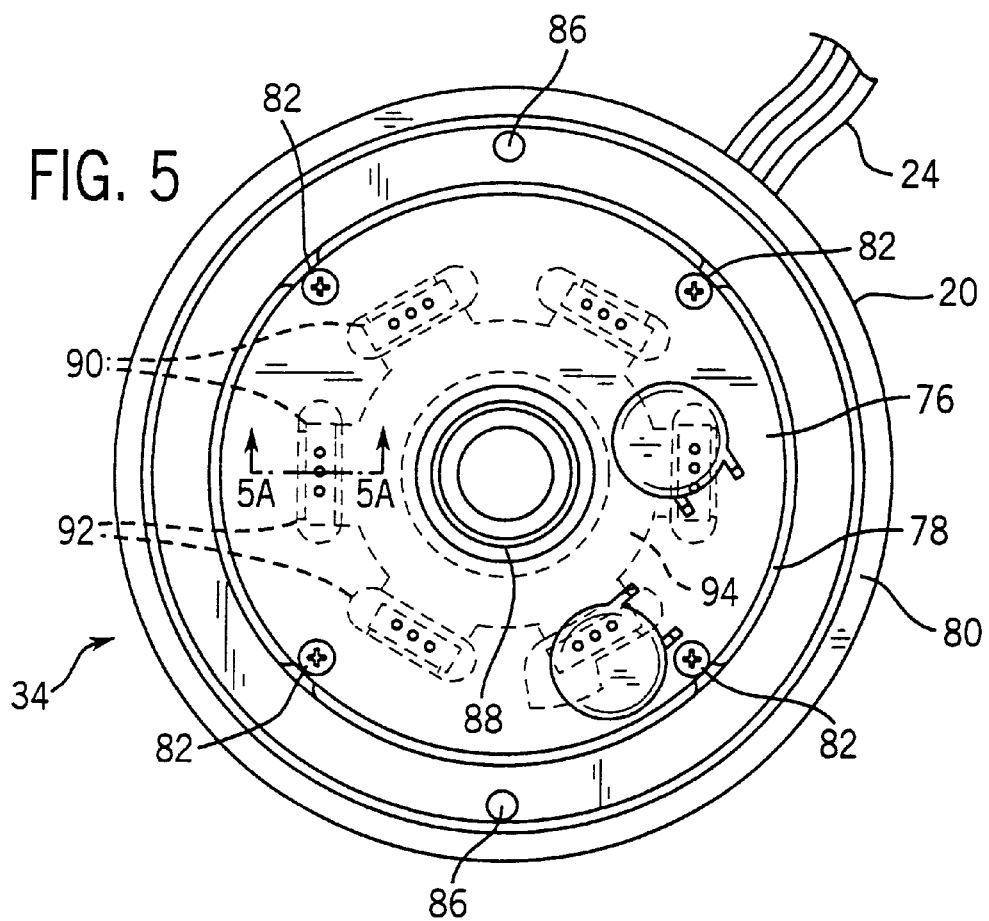
FIG. 5 is an end elevational view of the end cap and drive subassembly illustrated in FIG. 3.

Referring now more specifically to the preferred embodiment of circuit board 76, as best shown in FIGS. 5–7, circuitry for driving motor 12 is preferably supported on a generally annular board 76 having a front side 114, a rear side 116, and a substantially circular peripheral edge 118. A pair of notches 120 are formed in edge 118 to properly orient the circuit board within rear end cap 20 during installation. A central recess or aperture 122 is formed in circuit board 76 to permit passage of a portion of shaft 22 and rear bearing assembly 74 therethrough. In addition, aperture 122 serves to allow the position of sensing magnet assembly 70 to be adjacent to sensing devices following final assembly of unit 10 (see e.g., FIG. 2).

As best illustrated in FIGS. 6 and 7, to reduce the overall size of drive assembly 34, both front and rear sides 114 and 116 of circuit 76 are preferably populated with interconnected electronic control and drive components. In particular, drive components supported on rear side 116 of board 76 include six power switching elements in the form of MOSFETs and flyback diodes supported in lead frames 124 in manner well known in the art. Alternative switching elements include insulated gate bipolar transistors (IGBTs) and the like. Each lead frame 124 is electrically coupled to and mechanically supported on board 76 by a plurality of lead pins 126 extending from a base of each lead frame 124. In the preferred embodiment illustrated, the components supported on board 76 are arranged such that switching elements 90 are positioned radially in angularly equal spacing on the board. In particular, as best illustrated in FIG. 7, each switching element 90 is positioned at an angle 128, measured from a center 130 of board 76, to substantially equalize thermal loading and to enhance thermal transfer from the switching elements to rear end cap 20.

Figure 5A:
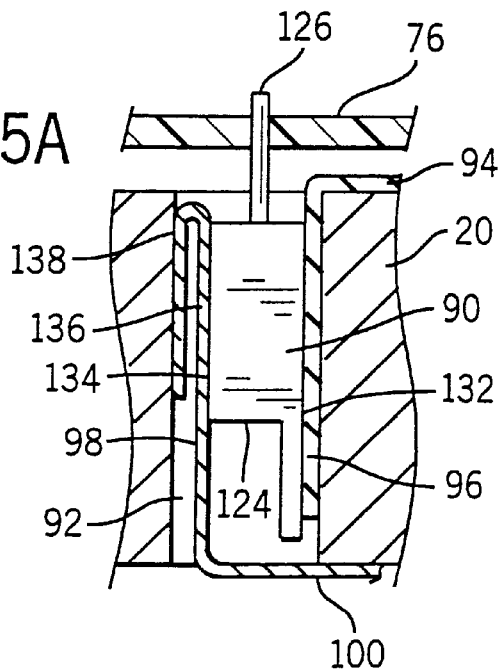
FIG. 5A is a detail sectional view of the assembly illustrated in FIG. 5, along line 5A—5A, showing a presently preferred arrangement for transmitting thermal energy from switching devices to a heat sink.

As shown in broken lines in FIG. 5, and in the sectional view of FIG. 5A, each lead frame 124 of power switching elements 90 is received within a corresponding recess 92 of rear end cap 20. Rear end cap 20 is preferably made of a thermally conductive material, such as aluminum. As mentioned above, during assembly of drive assembly 34, board 76 is fitted to rear end cap 20 and a sil pad 94 is positioned over a portion of rear end cap 20. Each switching element 90 forces an insulating extension 96 of sil pad 94 into each recess 92. Each insulating extension 96 is thus positioned between a lead frame package 124 and an inner surface of recess 92. In the presently preferred embodiment, sil pad 94, including insulating extensions 96, is stamped from an insulating material such as sheet material available under the commercial designation SP400.

Within each recess 92, a biasing member 98 of clip 100 urges a base 132 of lead frame 124 into tight contact against insulating extension 96 of sil pad 94, to promote thermal transfer from lead frame 124, through insulating extension 96 and thereby through rear end cap 20. Thus, each biasing member 98 is designed to fit between a side wall of recess 92 and a top surface 134 of each lead frame 124. Accordingly, each biasing member 98 includes a frame contacting portion 136 and a spring portion 138 bent back over frame contacting portion 136. Prior to installation, as illustrated in FIG. 8, spring portions 138 are positioned radially outwardly slightly from frame contacting portions 136. Clip 100 is preferably made of a light-weight resilient material, such as spring steel, such that as biasing members 98 are inserted between a side wall of a recess 92 and a lead frame 124, spring portion 138 is elastically deformed toward frame contacting portion 136. Because top surface 134 of lead frame 124 is non-conductive, switching element 90 remains electrically isolated from rear end cap 20. Moreover, insulating extension 96 of sil pad 94 effectively electrically insulates each lead frame 124 from rear end cap 20, while thermally coupling the lead frame to end cap 20 to promote conductive thermal transfer therethrough.

It should be noted that, while in the illustrated embodiment lead frames 124 are urged toward and thermally coupled to radially inner sides of recesses 92, lead frames 124 and clip 100 could alternatively be configured to dissipate thermal energy through radially outer sides of recesses 92, or through sides of recesses 92 oriented along radii of board 76, and so forth.

Several advantages flow from the foregoing structure, as will be readily appreciated by those skilled in the art. Firstly, by providing switching elements 90 in an upstanding position on circuit board 76, the overall size of the drive package is kept to a minimum. In addition, by thermally coupling power switching elements 90 to rear end cap 20, thermal transfer from the switching elements is greatly enhanced as compared to heretofore known drive systems, permitting the size of the drive to be further reduced. Similarly, by positioning the switching elements in radially spaced locations about board 76, an even temperature gradient is established through rear end cap 20 such that heat conducted from elements 90 is dissipated in a regular manner from recesses 92 toward the outer periphery of rear end cap 20. Furthermore, unlike heretofore known brushless DC motor drive packages, the foregoing structures permits rear end cap 20 to serve both as a drive and control circuit board support, as a heat sink, and as a mechanical support for rear bearing set 74 and shaft 22.

Figure 9:
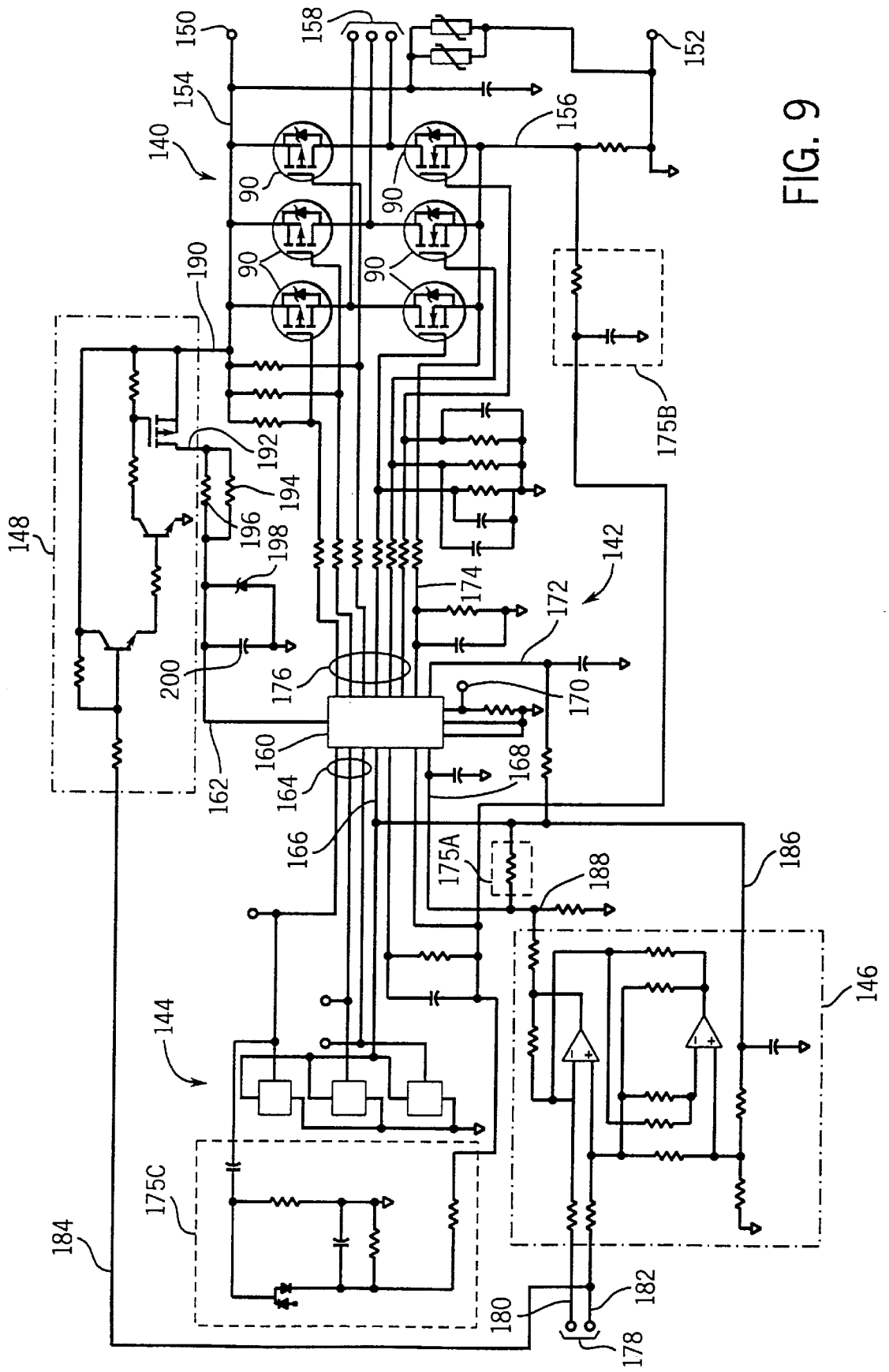
FIG. 9 is a diagrammatical view of a presently preferred electrical circuit for the drive, including drive circuitry, control circuitry, interface circuitry, and energy conservation circuitry.
Figure 9A:
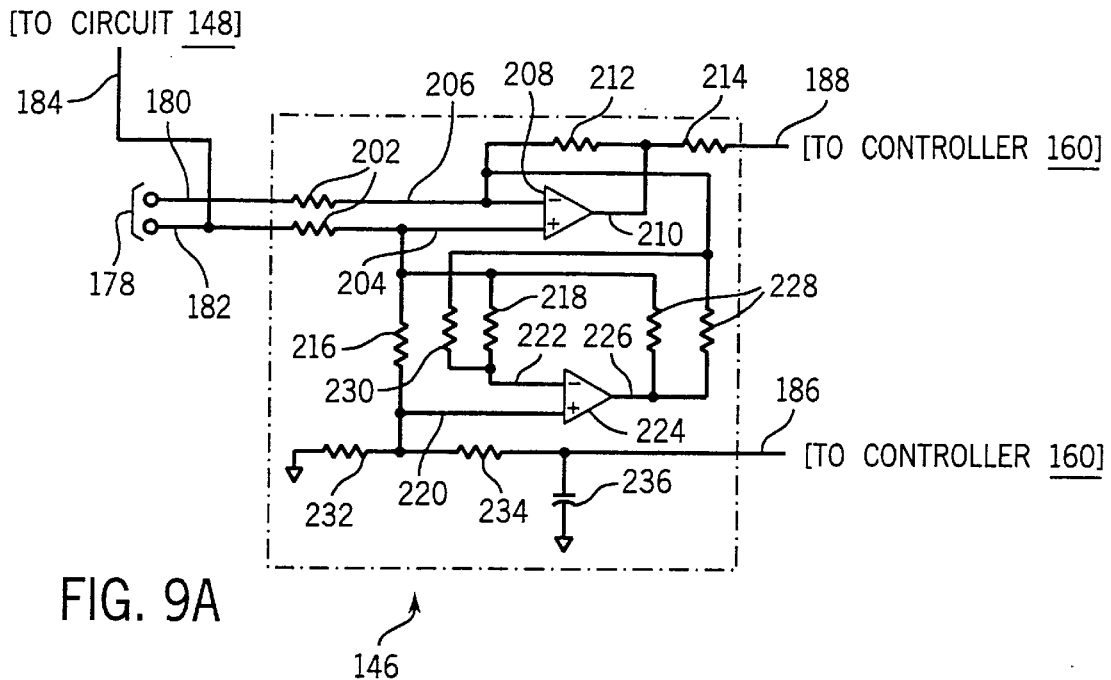
FIGS. 9A and 9B represent portions of the circuitry of FIG. 9 in greater detail, particularly suited for scaling incoming control signals and for conserving energy in the drive circuitry during periods when the electric motor is not being driven, respectively.
Figure 9B:
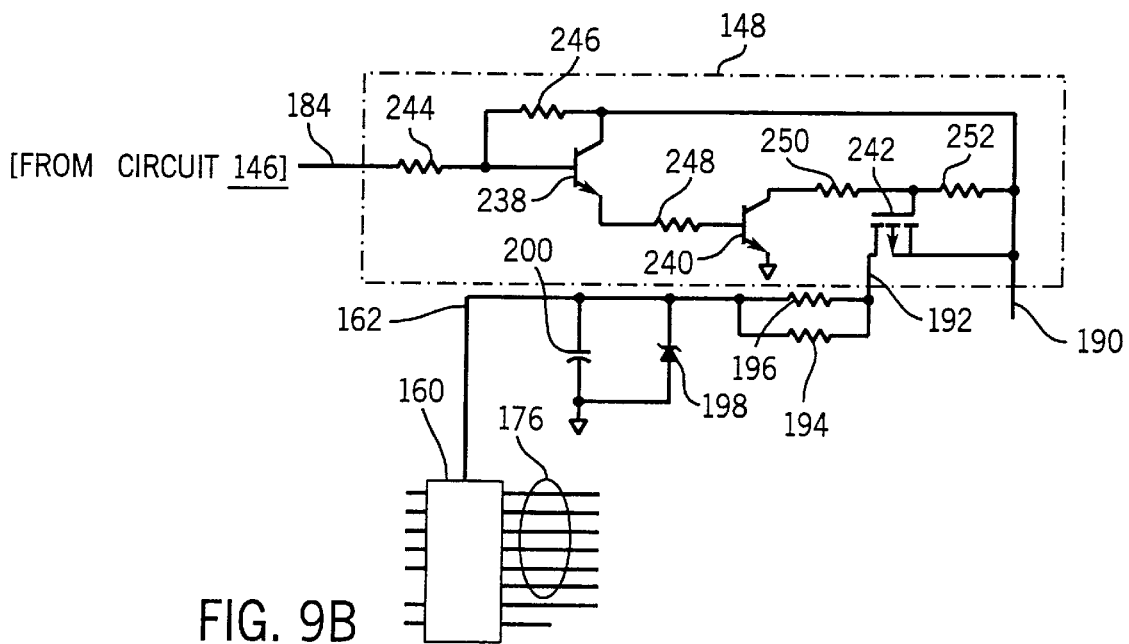

The presently preferred embodiment of drive 14 also includes advantageous configurations for drive circuitry as represented in FIGS. 9, 9A and 9B. Thus, as shown in FIG. 9, circuitry supported on board 76 includes a drive circuit 140, a control circuit 142, a commutation circuit 144, a signal conditioning circuit 146 and an energy conservation circuit 148. As will be appreciated by those skilled in the art, the preferred general arrangement of drive circuit 140, control circuit 142 and commutation circuit 144 shown in FIG. 9 may be of generally known construction. Therefore, although detailed components of these circuits have been represented in FIG. 9, they will only be described herein in detail as required to provide those skilled in the art with an understanding of the general operation of drive 14, and the particular operation of signal conditioning circuit 146 and energy conservation circuit 148.

Drive circuit 140 includes a plurality of switching elements 90, such as MOSFETs arranged in a three phase configuration. Drive 140 receives incoming power via terminals 150 and 152 from a source of energy, such as a battery system, alternator, generator, or other power supply circuitry of a known type. Moreover, drive circuit 140 may be configured to operate on a variety of power levels, such as 12 volts, 24 volts, and so forth. In addition, it should be noted that terminals 150 and 152 represented in FIG. 9 will generally correspond to two of the leads 24 extending from drive assembly 34 as described above.

Incoming power from terminals 150 and 152 is applied via DC bus lines 154 and 156 to power switching elements 90 as illustrated in FIG. 9. The conductive state of each switching element is controlled by control circuit 142 to produce three-phase output power which is conveyed to motor stator windings 42 (see e.g., FIG. 2), as indicated at terminals 158. As will be appreciated by those skilled in the art, each switching element 90 includes a solid state switch coupled in parallel with a flyback diode, permitting output power wave forms to be controlled to operate shaft 22 as desired. As mentioned above, the switch and flyback diode of each element 90 are preferably provided in a standard lead frame package. In the illustrated embodiment, output wave forms conveyed via terminals 158 are trapezoidal pulse width modulated wave forms having a duty cycle proportional to the desired control of motor 12.

Control circuit 142 includes a controller 160 configured to control the conductive states of switching elements 90 to maintain appropriate control of motor 12. In a presently preferred embodiment, controller 160 is a Motorola model MC33033DWR2 integrated circuit particularly designed for PWM DC motor drive control. Power is applied to controller 160 via a conductor 162 from energy conservation circuit 148. Feedback signals are applied to controller 160 via through feedback lines as indicated at reference numeral 164. As indicated at reference numeral 166, controller 160 furnishes a reference voltage output, such as 6 volts DC. A scaled command signal is applied to controller 160 via conductor 168. The manner in which the scaled command signal is generated by signal conditioning circuit 146 will also be described in greater detail below. Circuitry is also provided with controller 160 to permit reversing of motor 12, when desired, as indicated generally at reference numeral 170. A reference oscillation signal is provided for controller 160 as indicated at reference numeral 172. Controller 160 is also provided with a current feedback signal via conductor 174.

In operation, controller 160 is configured to receive the scaled command signal via conductor 168 and to control switching of elements 90 via output lines 176 based upon the scaled command signal and upon feedback signals received via input lines 164, to maintain the output of motor 12 at a level proportional to the scaled command signal. In a presently preferred embodiment, velocity command signals are applied to the drive and scaled which represent desired rotational velocities of the motor. However, command signals may represent other operating parameters, such as torque. As will be appreciated by those skilled in the art, feedback signals provided to controller 160 originate in commutation circuit 144, which preferably includes a series of Hall effect commutation sensors positioned on board 76 around the periphery of central aperture 122 adjacent to sensing magnet assembly 70. Commutation circuit 144 provides an indication of the angular position of shaft 22 by detecting fields emitted by sensing magnet assembly 70.

Also as illustrated generally in FIG. 9, additional circuit components may be associated with the foregoing circuitry to provide specialized functions. In the illustrated embodiment, three such optional circuits are shown. A first of these is a resistive circuit 175A which can be installed for open-loop operation of the drive. A second optional circuit is a torque control circuit 175B, which can be installed where the drive is to be employed as a torque control system. A third optional circuit is a control circuit 175C, which can be installed where the drive is to be employed for closed-loop control as in the preferred embodiment.

In addition to the foregoing circuitry, circuit board 76 preferably supports circuitry for regulating or normalizing input command signals, as well as circuitry for reducing the power consumption of controller 160 during periods in which motor 12 is not being driven. In particular, because drive 14 may be used in systems, such as blowers, refrigeration units, and so forth carried by motor vehicles and the like, variations in supply voltage applied to a command input device can result in corresponding variations in the input command signal, resulting in output which may vary in an undesirable manner due to the variations in the power supply voltage. In velocity control circuits, such variations typically result in driving the motor at speeds which do not correspond to the desired speed. Signal conditioning circuit 146 is designed to establish a uniform ground offset to reduce or eliminate the effects of such voltage variations. Also, it has been found that in heretofore known DC drive systems, control circuitry can draw currents on the order of 50 mA even where no command signal was being applied and the motor coupled to the drive was not being driven in rotation. Even such modest current levels can result in undesirable power consumption. Energy conservation circuit 148 is configured to significantly reduce the current drawn by drive 14 during such periods.

Returning to FIG. 9, signal conditioning circuit 146 receives command input signals from a source (as indicated generally at reference numeral 178), such as a manually operated potentiometer or an automatic controller (not shown). The command input signals are thus transmitted to circuit 146 via conductors 180 and 182. In addition, the command input signals are transmitted to energy conservation circuit 148 via conductor 184, electrically coupled to conductor 182. A reference voltage is supplied to signal conditioning circuit 146 via a conductor 186. Signal conditioning circuit 146 corrects variations in the input command signal and outputs a scaled command signal via conductor 188 which is, in turn, applied to controller 160 as indicated at reference numeral 168. The preferred structure and operation of signal conditioning circuit 146 is described below with reference to FIG. 9A.

Energy conservation circuit 148 receives the command input signal via conductor 184 and applies power to controller 160 via conductor 162 based upon the level of the input command signal. Circuit 148 receives incoming power via conductor 190 coupled to DC bus line 154. When energy conservation circuit 148 receives a command input signal via conductor 184 which is above a predetermined threshold (generally corresponding to a minimum allowable command), circuit 148 outputs power via a conductor 192. When the command input signal is below the predetermined threshold, circuit 148 interrupts power to conductor 192 as described in greater detail below. Power output via conductor 192 is filtered through a pair of parallel resistors 194 and 196 having values of 301 ohms. Downstream from resistors 194 and 196, power from circuit 148 is further filtered by a Zener diode 198 and a capacitor 200, coupled, in parallel, to ground. In the presently preferred embodiment, Zener diode 198 is a 24 volt diode, and capacitor 200 is a 10 microF capacitor. As will be appreciated by those skilled in the art, the foregoing filtering circuitry acts as a 24 volt limiting filter. Filtered power is then available to controller 160 via conductor 162.

Referring now more particularly to the preferred configuration of signal conditioning circuit 148, as best illustrated in FIG. 9A, circuit 146 receives a command input signal, as indicated at reference numeral 178, via conductors 180 and 182. In a presently preferred embodiment the command input signal varies between zero and 10 volts. The command input signal is then applied to a pair of resistors 202, each having a value of 499 Kohms. The command input signal is then transmitted via first and second inputs 204 and 206, respectively, to a first operational amplifier 208. Output 210 from operational amplifier 208 is fed back to input 206 through a 249 Kohm resistor 212. Output 210 is also conveyed to controller 160 along conductor 188 through a 9.76 Kohm resistor 214. As explained in greater detail below, output along conductor 188 is the corrected command signal used to drive motor 12.

Input 204 to first operational amplifier 208 is conveyed through first and second resistors 216 and 218 to inputs 220 and 222, respectively, of a second operational amplifier 224. Resistors 216 and 218 have resistance values of 249 Kohm and 20 Kohm, respectively. Output 226 of second operational amplifier 224 is fed back through a pair of 20 Kohm resistors 228 to the input side of second operational amplifier 224 as illustrated in FIG. 9A, as well as to input 206 of first operational amplifier 208. Moreover, downstream of one of resistors 228, output 226 from second operational amplifier 224 is fed back in parallel with resistor 218 to input 222 of second operational amplifier 224 through a 20 Kohm resistor 230. Input 220 of second operational amplifier 224 is coupled to ground through a 910 ohm resistor 232. Input 220 is also referenced through a 20 Kohm resistor 234 in conjunction with a 0.1 microF filter capacitor 236.

Signal conditioning circuit 146, configured as described above, functions as follows. An input command signal, such as a velocity command signal, is delivered to circuit 146 at terminals 178. Conductor 180 will typically be tied to a ground potential, such as a vehicle frame or the like. The components of circuit 146 filter the incoming signal from conductor 182 to establish an artificial ground at input 220 of second operational amplifier 224, by virtue of the relative values of resistors 232 and 234. Reference line 186, which is coupled from controller 160, conveys a 6 volt reference signal to the conditioning circuit 146. Moreover, operational amplifier 224 serves to balance current to input nodes 204 and 206 of first operational amplifier 208. Output 210 of first operational amplifier 208, scaled through resistor 214, represents a command signal which is substantially independent of voltage variations in the ground to which drive 14 is connected, providing reliable control. Moreover, as will be appreciated by those skilled in the art, where a system includes multiple motors driven by similar drives 14, each equipped with a signal conditioning circuit 146, all similarly commanded motors will be driven equally despite relative differences in the ground potential of the individual motors.

Referring now to FIG. 9B, energy conservation circuit 148 is preferably configured as follows. The input command signal transmitted to signal conditioning circuit 146 via conductor 182 (see FIG. 9A) is applied to circuit 148 via conductor 184. Also, as mentioned above, incoming power is applied to circuit 148 via conductor 190. Circuit 148 comprises a series of solid state switching devices including transistors 238 and 240, and a P channel power MOSFET 242 interconnected as illustrated in FIG. 9B. The input command signal conveyed via conductor 184 is applied to the base of transistor 238 through a 100 Kohm resistor 244. The signal is input to the base of transistor 238. A bias is also supplied from the collector of the same transistor through a 2.2 Mohm resistor 246 to the base. The emitter of transistor 238 is coupled to the base of transistor 240 through a 100 Kohm resistor 248. Moreover, the collector of transistor 240 is coupled to the source of direct current power, incoming through conductor 190, through a pair of 6.81 Kohm resistors connected in series, as indicated at reference numerals 250 and 252. The emitter of transistor 240 is coupled to ground. The gate of MOSFET 242 is coupled to the source of incoming power through resistor 252, while the source of MOSFET 242 is coupled to incoming power line 190.

Energy conservation circuit 148, configured as described above, functions as follows. When the input command signal applied via conductor 184 is below a predetermined threshold value, such as 400 to 500 mV, transistor 238 will remain in a non-conducting state. Accordingly, the base of transistor 240 will similarly be at a low voltage, placing transistor 240 in a non-conductive state. As a result, MOSFET 242 will remain in a non-conductive state, preventing power from being applied to controller 160 via conductor 192. When the input command signal rises above the predetermined threshold, such as above 500 mV, transistor 238 is switched to a conducting state, driving the base of transistor 240 to a higher voltage, and thus placing transistor 240 in a conducting state. As a result, the collector of transistor 240 will drop to a low voltage, causing MOSFET 242 to conduct power to output conductor 192. Thus, power conservation circuit 148 applies power to controller 160 only when the input command signal is above the predetermined threshold. Conversely, each time the input command signal drops below the threshold, power will be interrupted to controller 160, preventing excessive current draw during periods of non-operation, and consequently limiting the power consumption of the drive during such periods. It has been found that by virtue of circuit 148, current draw by the drive circuitry can be reduced to a leakage current on the order of 2 microA during periods in which circuit 148 interrupts power to controller 160.

Figure 10A:
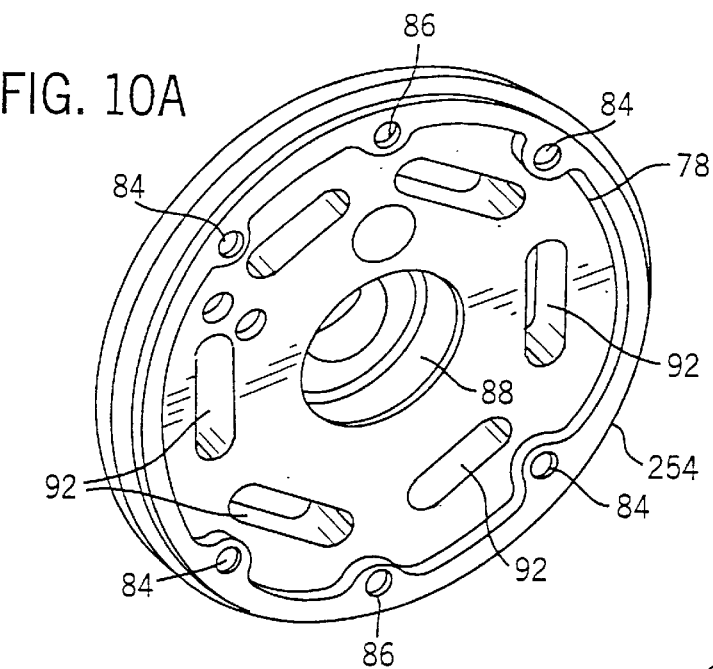
FIGS. 10A and 10B are perspective views of an alternative configuration for a heat sink and end cap for use in the electric motor and drive package illustrated in FIGS. 1 through 4.
Figure 10B:
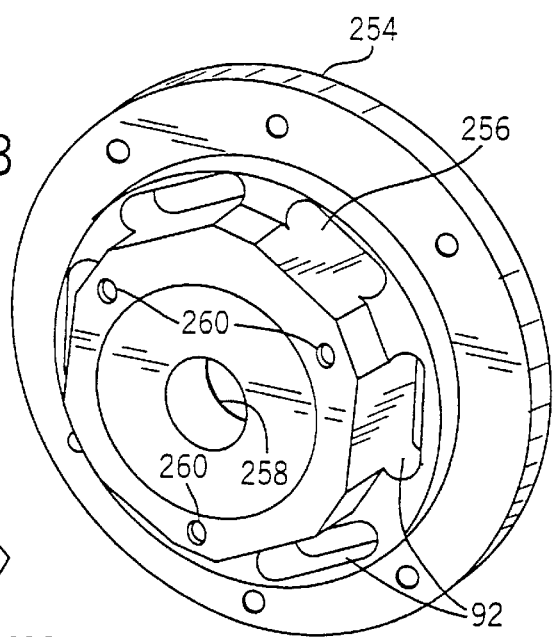

As mentioned above, the various components and subassemblies of motor and drive unit 10 can be adapted for specific applications in a variety of manners. FIGS. 10–12 illustrate certain of the alternative embodiments for rear end cap 20 currently contemplated. As illustrated in FIGS. 10A and 10B, in a first alternative embodiment, a rear end cap may be configured as an open support, designated generally by the reference numeral 254, having a rear extension 256 and a central aperture 258. Support 254 includes threaded apertures 84 for receiving fasteners used to support circuit board 76 within a recess as described above. Also, support 254 includes a series of recesses or apertures 92 in radially spaced locations for receiving switching elements 90 and for transmitting heat from the switching elements during operation. In the embodiment of FIGS. 10A and 10B, when inserted into recesses 92, the switching elements abut flat inner walls of each recess defined by extension 256 (see FIG. 10B). Also, while support 254 includes a bearing support recess 88 for receiving and supporting a rear bearing set as described above, aperture 258 permits the shaft of a motor to extend through the support. Accordingly, a support such as illustrated in FIGS. 10A and 10B, or a modification of that support, may be employed for converting the embodiment described above to a double-ended output shaft arrangement, such as, by way of example, for driving a pair of fans. Moreover, aperture 258 may also be used to pass certain products through the motor and drive unit as desired, such as through the use of a hollow shaft. Such supports and shafts may typically find application in fiber spinning and textile manufacturing industries. It should also be noted that a series of apertures 260 may be formed in support 254 (see FIG. 10B) for receiving fasteners for fixing of various components to support 254.

Figure 11A:
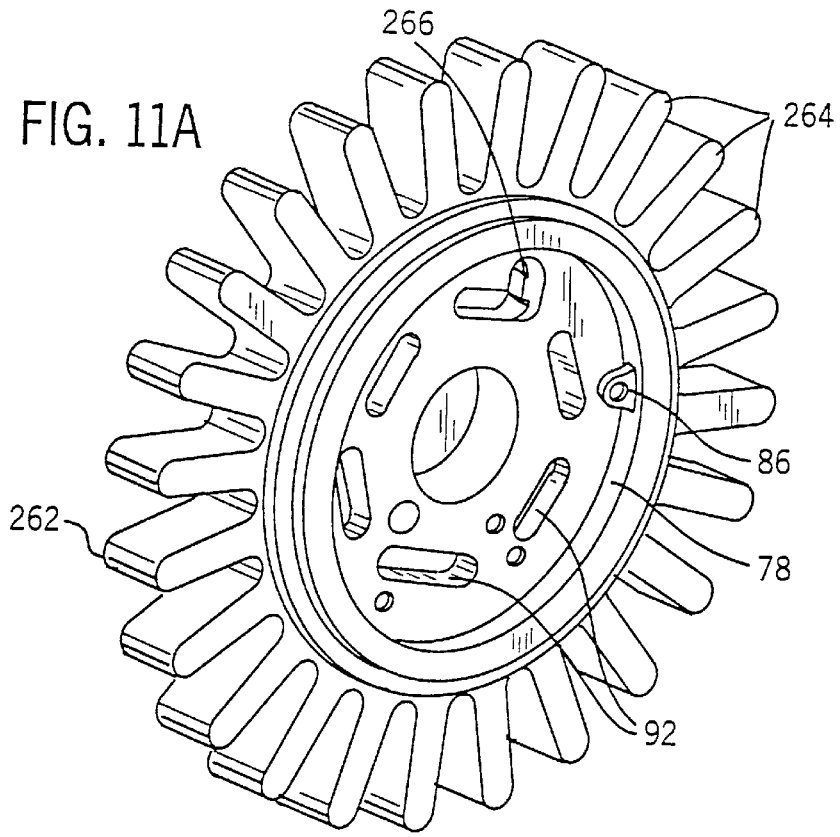
FIGS. 11A and 11B are perspective views of an additional alternative configuration for a heat sink and end cap for the electric motor and drive package.
Figure 11B:
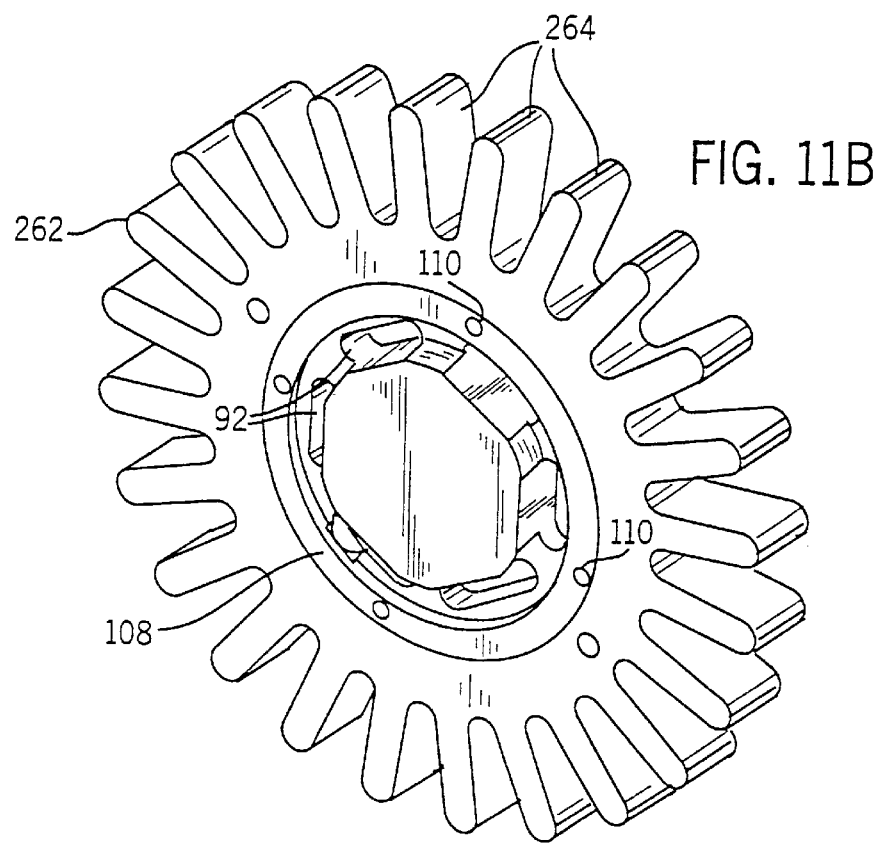
Figure 12:
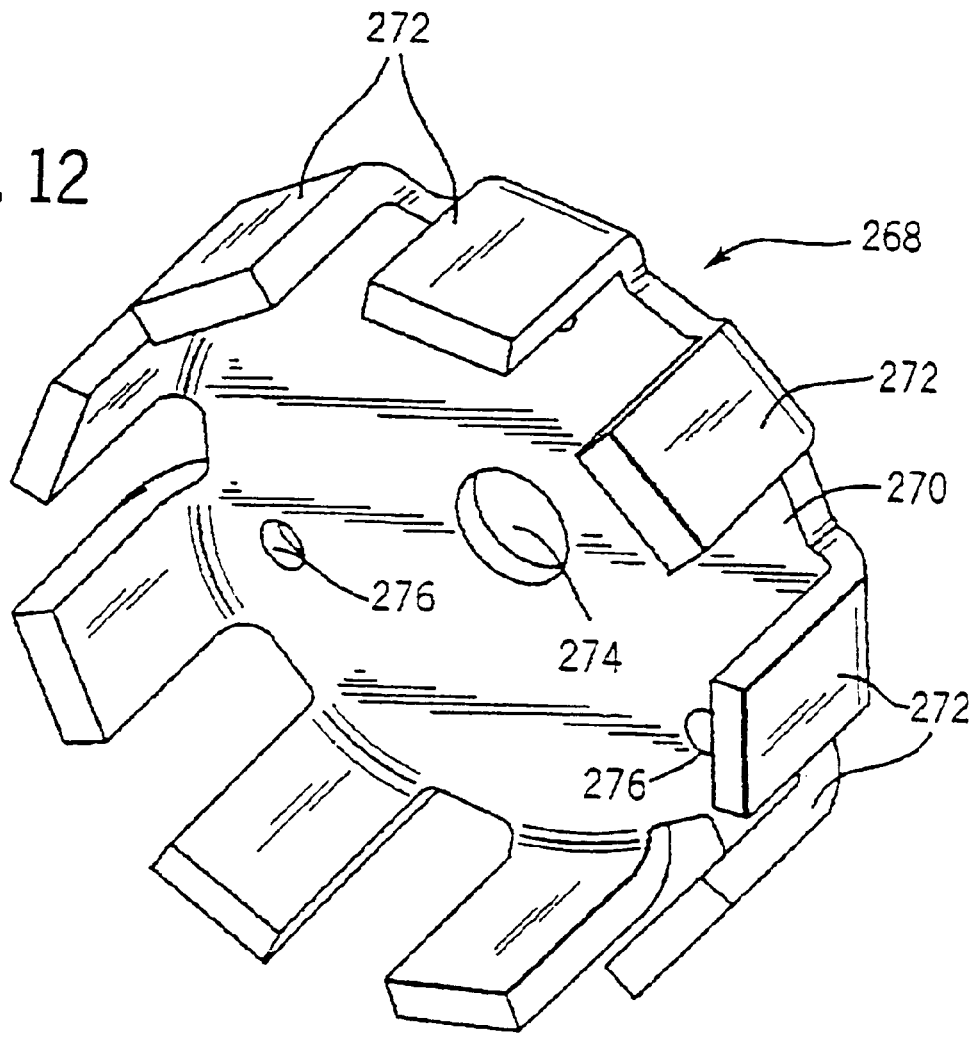
FIG. 12 is a perspective view of a further alternative configuration for a heat sink designed to be secured to an end cap of the types illustrated in FIG. 2, 10A and 10B.

Referring now to FIGS. 11A and 11B, in another alternative configuration, a support 262 for inclusion in a drive assembly of the type described above may include a series of peripheral fins 264 for dissipating heat generated by the drive circuitry supported thereon. As described above, support 262 includes features for receiving and supporting a circuit board as well as a shaft support bearing. Moreover, recesses 92 are provided as described above for receiving and transmitting heat from power switching components supported on the drive circuit board. Also, as illustrated in FIG. 11A, a routing passage 266 may be provided for leads (see, e.g., leads 24 shown in FIG. 3) extending from a circuit board supported by support 262.

FIG. 12 illustrates a heat sink configured for coupling to a support or end cap, such as support 254 illustrated in FIGS. 10A and 10B. In the illustrated embodiment, heat sink 268 includes a planar central portion 270 having integrally formed heat dissipating fins 272 extending about its periphery. A central aperture 274 is formed in heat sink 268 to permit the passage of a shaft or product therethrough, as mentioned above with respect to FIGS. 10A and 10B. Apertures 276 are provided in central portion 270 for receiving fasteners for fixing heat sink 268 to a support or end cap. For example, fasteners (not shown) may be inserted through apertures 276 and threaded into apertures 260 of a support or end cap of the type illustrated in FIG. 10B.

In addition to the foregoing alternative configurations, it should be noted that while in the illustrated embodiment drive assembly 34 is configured as a rear end cap, where appropriate, a similar assembly may include a central aperture, such as illustrated for support 254 in FIGS. 10A and 10B, permitting its use as a front end cap of motor 12. Moreover, apertures, such as apertures 110 shown in FIGS. 2 and 11B, or apertures 260 shown in FIG. 10B may be used to support motor and drive unit 10, rather than a mounting flange arrangement, such as flange 26 shown in FIGS. 2–4. As will be appreciated by those skilled in the art, the use of end cap 20 or the alternative supports described above to mount motor and drive unit 10 further eliminates an additional component from the motor and drive unit package.

While the invention may be susceptible to various modifications and alternative forms, specific embodiments have been shown in the drawings and have been described in detail herein by way of example only. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An integrated electric motor and drive system comprising:
    a substantially annular housing having first and second ends;
    a rotor supported for rotation in the housing;
    a stator disposed in the housing and surrounding the rotor;
    a drive circuit electrically connected to the stator, the drive circuit including a plurality of switching devices for generating pulsed electrical energy for causing rotation of the rotor;
    a first end cover secured to the first end of the housing and having a first bearing for supporting the rotor in rotation; and
    a second end cover secured to the second end of the housing, the second end cover supporting the drive circuit within a volume defined between the housing and the second end cover, the second end cover having a second bearing for supporting the rotor in rotation, the drive circuit being electrically insulated from the second end cover.

2. The system of claim 1, wherein the drive circuit is supported on a substantially annular circuit board, and wherein the rotor includes a rotor shaft extending through the circuit board.

3. The system of claim 2, wherein the rotor shaft extends through the first end cover.

4. The system of claim 1, wherein the drive circuit includes a controller circuit configured to regulate operation of the switching devices for generating the pulsed electrical energy.

5. The system of claim 1, wherein the second end cover includes at least one recess for receiving a portion of the drive circuit, and wherein at least a portion of the drive circuit is disposed within the at least one recess.

6. The system of claim 5, wherein the second end cover includes a plurality of recesses, and wherein each of the switching devices is disposed within a respective recess.

7. The system of claim 1, wherein the first or second end cover includes a mounting surface and a plurality of apertures extending through the mounting surface for mounting the system.

8. The system of claim 1, wherein the rotor includes permanent magnet elements configured to cooperate with the stator to cause rotation of the rotor when the pulsed electrical energy is applied to the stator.

9. The system of claim 8, wherein the drive circuit includes at least one sensor system for detecting angular position of the rotor.

10. The system of claim 9, wherein at least a portion of the sensor system is supported on a common circuit board with the switching devices.

11. A drive unit for a brushless DC motor, the motor including a housing having first and second ends, a rotor having a shaft rotatable within the housing, and a stator disposed within the housing about the rotor, the drive unit comprising:
    a support having a central recess for receiving a bearing for supporting the rotor shaft, the support configured to interface with the first end of the housing to secure the support to the housing;
    a bearing set disposed in the central recess of the support; and
    a drive circuit mounted within the central recess of the support about the bearing set so as to be enclosed between the support and the first end of the housing when the drive unit is secured thereto, the drive circuit being electrically insulated from the support and configured to be electrically connected to the stator, the drive circuit including a plurality of switching devices for converting electrical energy to pulsed electrical energy.

12. The drive unit of claim 11, wherein the support is configured to substantially close the first or second end of the housing.

13. The drive unit of claim 11, wherein the drive circuit is supported on a substantially annular circuit board, and wherein the rotor includes a rotor shaft extending through the circuit board.

14. The drive unit of claim 11, wherein the support includes a plurality of second recesses, and wherein each switching device is at least partially disposed within a respective second recess.

15. The drive unit of claim 11, wherein the drive circuit includes at least one sensor system for detecting angular position of the rotor.

16. The drive unit of claim 15, wherein at least a portion of the sensor system is supported on a common circuit board with the drive circuit.

17. A drive unit for a brushless DC motor, the motor including a housing having first and second ends, a rotor having a shaft rotatable within the housing, and a stator disposed within the housing about the rotor, the drive unit comprising:

a drive circuit including a plurality of switching devices for converting electrical energy to pulsed electrical energy for driving the rotor; and a support having first and second sides, the support being configured to receive and support the drive circuit on the first side thereof, the first side of the support being configured to face the first or second end of the housing to enclose the drive circuit therebetween, the support including a plurality of apertures for receiving fasteners for securing the support to the housing; the drive circuit being electrically insulated from the support.

18. The drive unit of claim 17, wherein the support includes a bearing recess for receiving a rotor shaft bearing.

19. The drive unit of claim 17, wherein the support is configured to substantially close the first end of the housing.

20. The drive unit of claim 17, wherein the drive circuit is supported on a substantially annular circuit board having a central aperture for receiving the rotor shaft therethrough.

21. An end cap for an electric motor and drive system, he system including a housing having first and second ends, a rotor having a shaft rotatable within the housing, a stator disposed within the housing about the rotor, and a drive circuit having switching elements for converting electrical energy to pulsed electrical energy, the end cap comprising:

a substantially cylindrical member having first and second sides, the first side being configured to receive and support the drive circuit and to electrically insulate the cylindrical member from the drive circuit;

a bearing support surface on the first side of the cylindrical member for receiving and supporting a rotor shaft bearing; and a plurality of apertures for receiving fasteners for securing the end cap to the housing.

22. The end cap of claim 21, wherein the first side is configured to face the first or second end of the housing when the end cap is secured thereto.

23. The end cap of claim 21, wherein the first side includes a plurality of second apertures radially spaced from the bearing support surface for receiving fasteners for securing the drive circuit to the first side.

24. The end cap of claim 21, further comprising a plurality of recesses for receiving the switching devices of the drive circuit.

* * * * *